United States Patent
Andrejewski

(12) 
(10) Patent No.: US 12,484,587 B1
(45) Date of Patent: Dec. 2, 2025

(54) WAFFLE CONE FORMING APPARATUS

(71) Applicant: Stanley Andrejewski, Erie, PA (US)

(72) Inventor: Stanley Andrejewski, Erie, PA (US)

( * ) Notice: Subject to any disclaimer, the term of this patent is extended or adjusted under 35 U.S.C. 154(b) by 329 days.

(21) Appl. No.: 17/407,599

(22) Filed: Aug. 20, 2021

(51) Int. Cl.
*A21B 5/02* (2006.01)
*A47J 37/06* (2006.01)

(52) U.S. Cl.
CPC ............ *A21B 5/026* (2013.01); *A47J 37/0611* (2013.01)

(58) Field of Classification Search
CPC ...... A23G 3/343; A23G 9/288; A23G 3/2023; A23G 9/22; A23G 9/503; B65D 85/78; B65D 81/38; B65D 43/0222; B65D 25/108; B65D 81/262; B65D 25/10; B65D 81/261
USPC ......... 99/337, 325, 332, 335, 342, 353, 376, 99/380, 383, 389, 403, 432, 428, 439, 99/433
See application file for complete search history.

(56) References Cited

U.S. PATENT DOCUMENTS

| | | | | |
|---|---|---|---|---|
| 2,508,724 A | * | 5/1950 | Moffett, Jr. ............ | A23G 9/506 426/138 |
| 4,651,634 A | * | 3/1987 | Barton .................... | A21B 5/026 99/332 |
| 4,817,513 A | * | 4/1989 | Carbon .................. | A21B 5/026 99/383 |
| 6,044,755 A | * | 4/2000 | Misceo .................. | A21B 5/023 99/332 |
| 2010/0024662 A1 | * | 2/2010 | Bengtson ............. | A47J 37/0611 99/377 |
| 2020/0229451 A1 | * | 7/2020 | Ericksen ................ | A21D 13/48 |
| 2021/0298313 A1 | * | 9/2021 | Petrov ................... | A47J 36/321 |

* cited by examiner

*Primary Examiner* — Helena Kosanovic
*Assistant Examiner* — Yeong Juen Thong
(74) *Attorney, Agent, or Firm* — Richard K Thomson

(57) ABSTRACT

A waffle cone forming apparatus includes an inner conical mold with a plurality of waffle-forming recesses arrayed in several rows about the periphery of the conical mold. A clamshell mold assembly surrounds the inner conical mold, the clamshell mold assembly having two halves hinged together and each having protrusions formed on its inner periphery corresponding in size, shape and number to the waffle-forming recesses about the periphery of the conical mold. Heating elements are associated with each of the inner conical mold and the clamshell mold assembly which surround the inner conical mold to bake a waffle dough/batter placed in the waffle cone forming apparatus.

4 Claims, 4 Drawing Sheets

WAFFLE CONE FORMING APPARATUS

BACKGROUND AND SUMMARY OF THE INVENTION

The present invention is directed to the field of culinary creativity. More particularly, the present invention is directed to apparatus for forming a waffle cone.

What passes for a "waffle cone" in today's market is in essence a pizzelle contorted into a conical shape. It is the object of the present invention to provide a true "waffle cone" and a method and apparatus to make it. The device features an inner conical member and a clamshell outer multi-part conical member that opens to release the waffle cone for further handling. It is envisioned that, in addition to ice cream, the waffle cone may be a carrier for other food stuffs, such as breakfast items (eggs, bacon, ham, cereal, fruit, etc.) and dinner items (chicken fingers, vegies, mashed potatoes and gravy, cake, pie filling, etc.).

The present invention comprises a waffle cone forming apparatus that includes: a) an inner conical mold with a plurality of waffle-forming recesses arrayed in several rows about the periphery of the conical mold; b) a clamshell mold assembly which surrounds the inner conical mold, the clamshell mold assembly having two halves hinged together and each having protrusions formed on its inner periphery corresponding in size, shape and number to the waffle-forming recesses about the periphery of the conical mold; c) heating elements associated with each of the inner conical mold and the clamshell mold assembly which surround the inner conical mold to bake a waffle dough/batter placed in the waffle cone forming apparatus.

In addition, a pair of knobs are attached to the clamshell mold assembly, one knob of the pair on each of the two halves to facilitate opening and closing of the clamshell mold assembly. An elevating means is operable with the clamshell mold assembly for raising and lowering the assembly.

Means for compressing the two halves of the clamshell mold about the inner conical mold are provided, the means for compressing including a tapered semi-annular surface formed on a bottom edge of each of the two halves of the clamshell mold assembly and an annular ring surrounding the inner conical mold.

In a second embodiment a pair of gates are provided, one said gate sitting atop each of the clamshell mold halves to facilitate pouring of liquid waffle batter into the waffle cone forming apparatus.

Various other features, advantages, and characteristics of the present invention will become apparent after a reading of the following detailed description.

BRIEF DESCRIPTION OF THE DRAWINGS

The preferred embodiment(s) of the present invention is/are described in conjunction with the associated drawings in which like features are indicated with like reference numerals and in which.

DETAILED DESCRIPTION OF THE PREFERRED EMBODIMENT(S)

Figure 1:
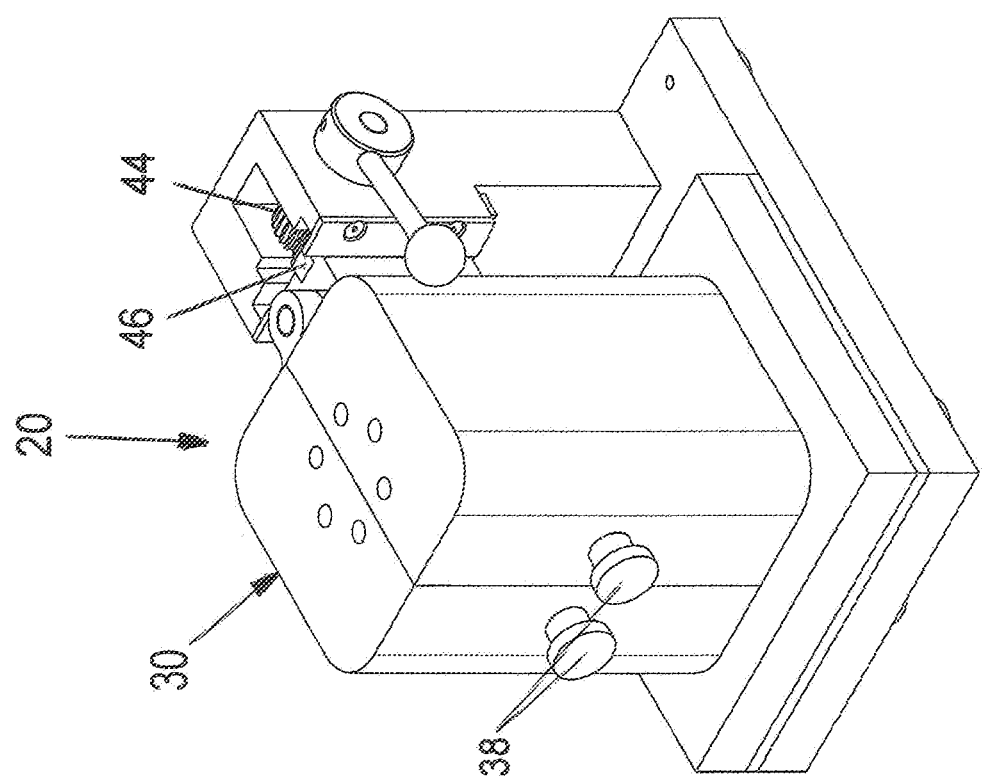
FIG. 1 is a front perspective view of the waffle cone forming apparatus with the clamshell outer mold open.
Figure 2:
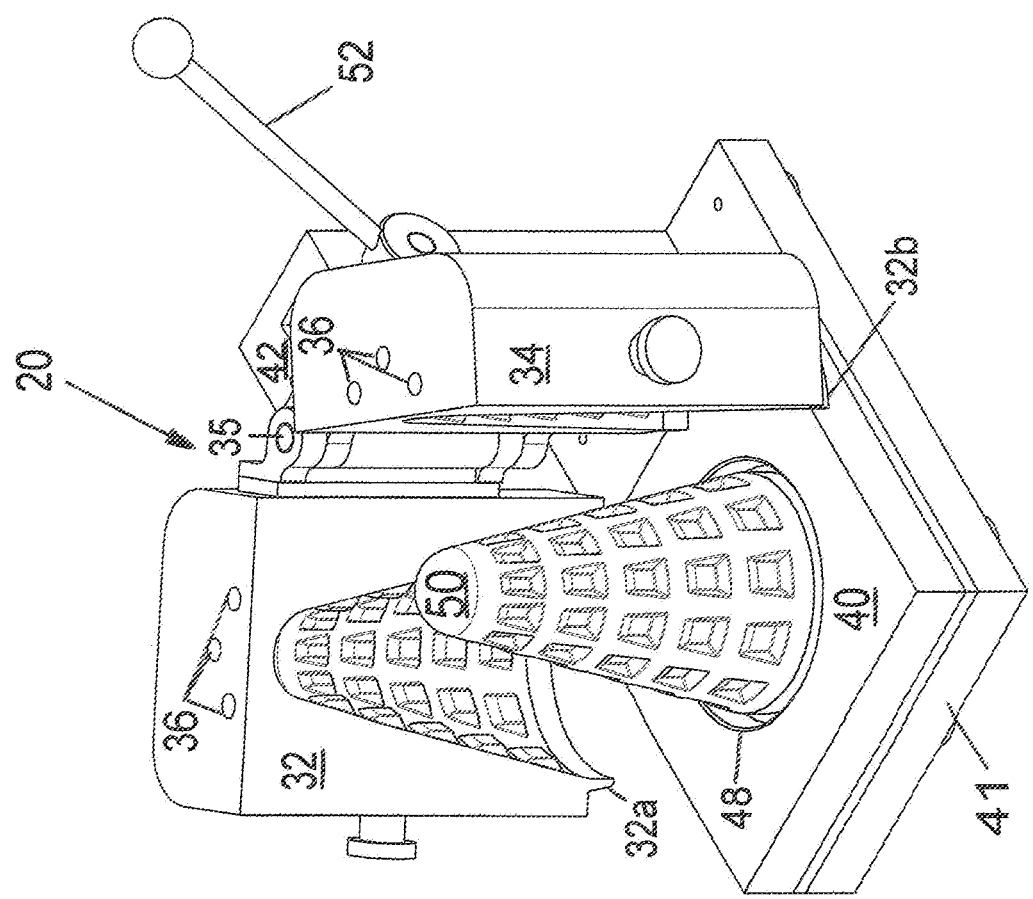
FIG. 2 is a front perspective view with the clamshell outer mold closed.
Figure 3B:
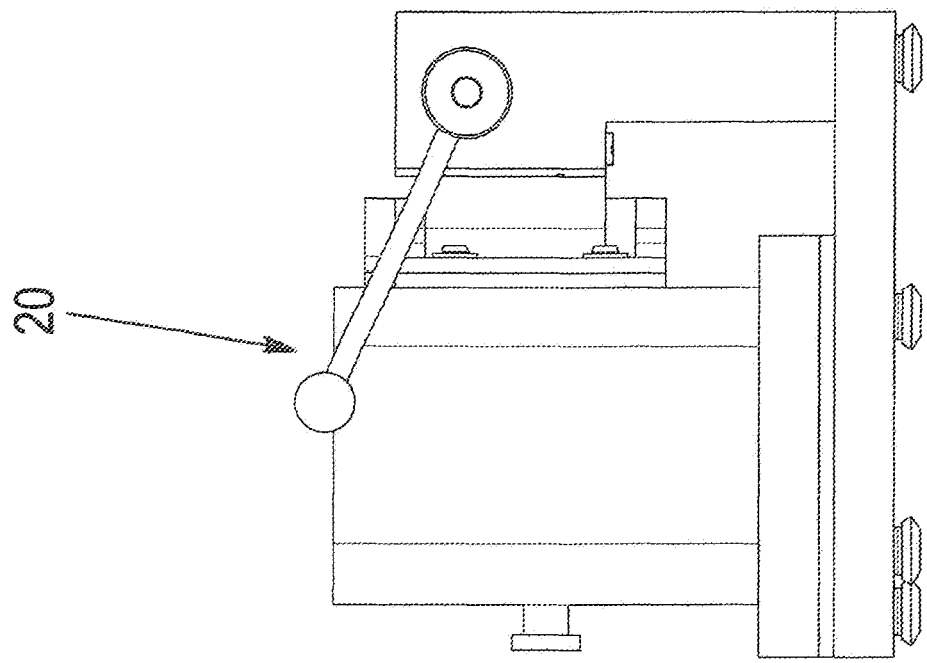
FIG. 3B is a left side view with the outer mold closed.
Figure 3A:
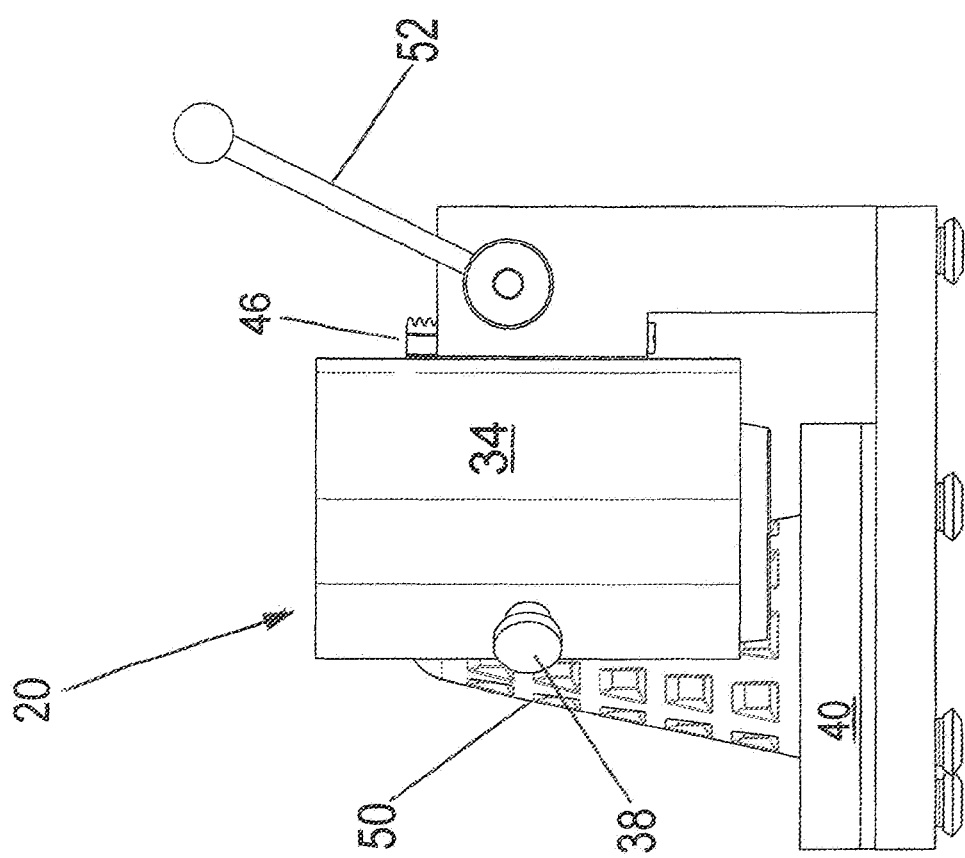
FIG. 3A is a left side view with the outer mold open.
Figure 4B:
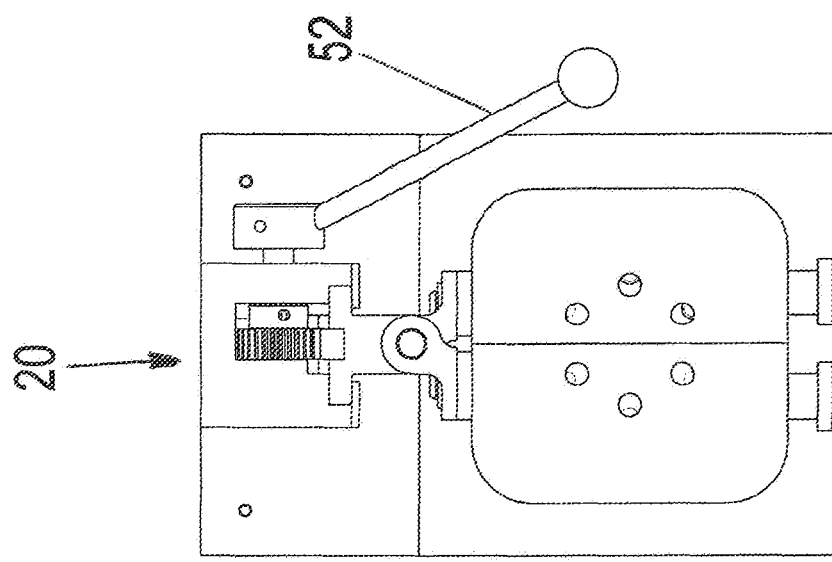
FIG. 4B is a top view with the clamshell outer mold closed.
Figure 4A:
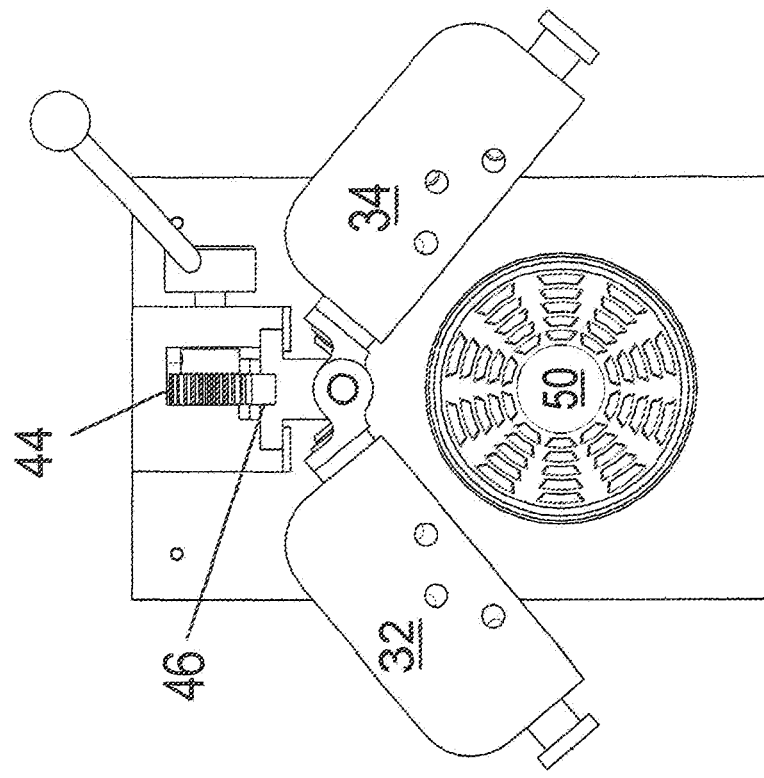
FIG. 4A is a top view with the clamshell outer mold open.

A first embodiment of the waffle cone forming apparatus of the present invention is depicted in FIGS. 1-4B generally at 20. Waffle cone forming apparatus 20 is comprised of outer clamshell mold assembly 30 and inner domed conical mold 50. Each of the outer clamshell mold assembly 30 and inner conical mold 50 are constructed of metal (e.g., cast aluminum, steel, or the like). Outer clamshell mold assembly 30 is made up of first right cavity member 32 and second left cavity member 34 which are secured by hinge pin 35. Actual mold cavities of cavity mold members 32, 34 have a plurality of protrusions which form the waffling pattern on the exterior of the waffle cone. These protrusions are rectangular on their outermost extent and rhomboid at their base. A series of heater rods 36 surround the cavities in each of the cavity members 34, 36 to elevate the metal cavity mold members 32, 34 to a suitable cooking temperature (circa 415°). Similar heating rods (not shown) extend into the conical mold 50 from the bottom. A pair of knobs 38 (FIG. 2) facilitate the opening and closing of the two clam shell mold halves 32, 34. Although the knobs 38 are formed of heat-resistant material, best practice will involve the use of insulated oven-mitts when handling the waffle cone forming apparatus 20.

The domed conical mold 50 has a series of waffle forming recesses on the exterior generally opposing the protrusions on cavity members 32 and 34. These recesses are similar in shape having a rectangular base surface and rhomboid outermost periphery. The sloping surfaces of the walls extending between the rhomboid and the rectangular walls facilitate the removal of the waffle cone from the device. As can be best seen in FIGS. 1 and 4A, the recesses (and the protrusions as well) grow larger in each successive row, going from top to bottom on the mold (visa versa on the cone, itself).

A base plate 40 has an annular recess 48 into which domed conical mold 50 is secured. A sub-base plate 41 mounts both base plate 40 and a support pillar 42. Pinion gear 44 within support pillar 42 engages gear rack 46 attached to a rear surface of clam shell mold assembly 50. Handle 52 is used to lower and raise clam shell mold assembly 30 by rotating pinion gear 44 in a counter-clockwise and clockwise direction, respectively. Tapered camming surfaces 32a and 32b on the bottoms of cavity members 32, 34, respectively, serve to drive members 32, 34 into close proximity to fully extend the dough ball (not shown) over the conical mold 50 prior to baking.

In use, a ball of pre-made waffle dough will be pressed down on the domed conical mold 50. The closing of the clam shell cavity mold members 32, 34 using handles 38 will further draw the dough down over the cone. As the handle 52 is rotated in a counter-clockwise direction, the dough will be further extended over the conical surface of mold 50 and the camming surfaces 32a and 32b will further squeeze the halves 32 and 34 and, by extension, waffle dough to the final desired thickness of the cone prior to baking. It will be noted that since protrusions on the clam shell cavity members 32, 34 are opposed to the recesses in domed conical mold 50, the finished waffle cone will be of a generally uniform thickness throughout. When the handle 52 is rotated in the clockwise direction, the clam shell halves 32, 34 will lift the fully baked waffle cone off of the conical mold surface and opening of the clam shell halves 32, 34 will release the waffle cone from the clam shell mold assembly 30 allowing it to fall gently onto conical mold 50 where it can be manually removed from the molding machine 20.

Figure 5:
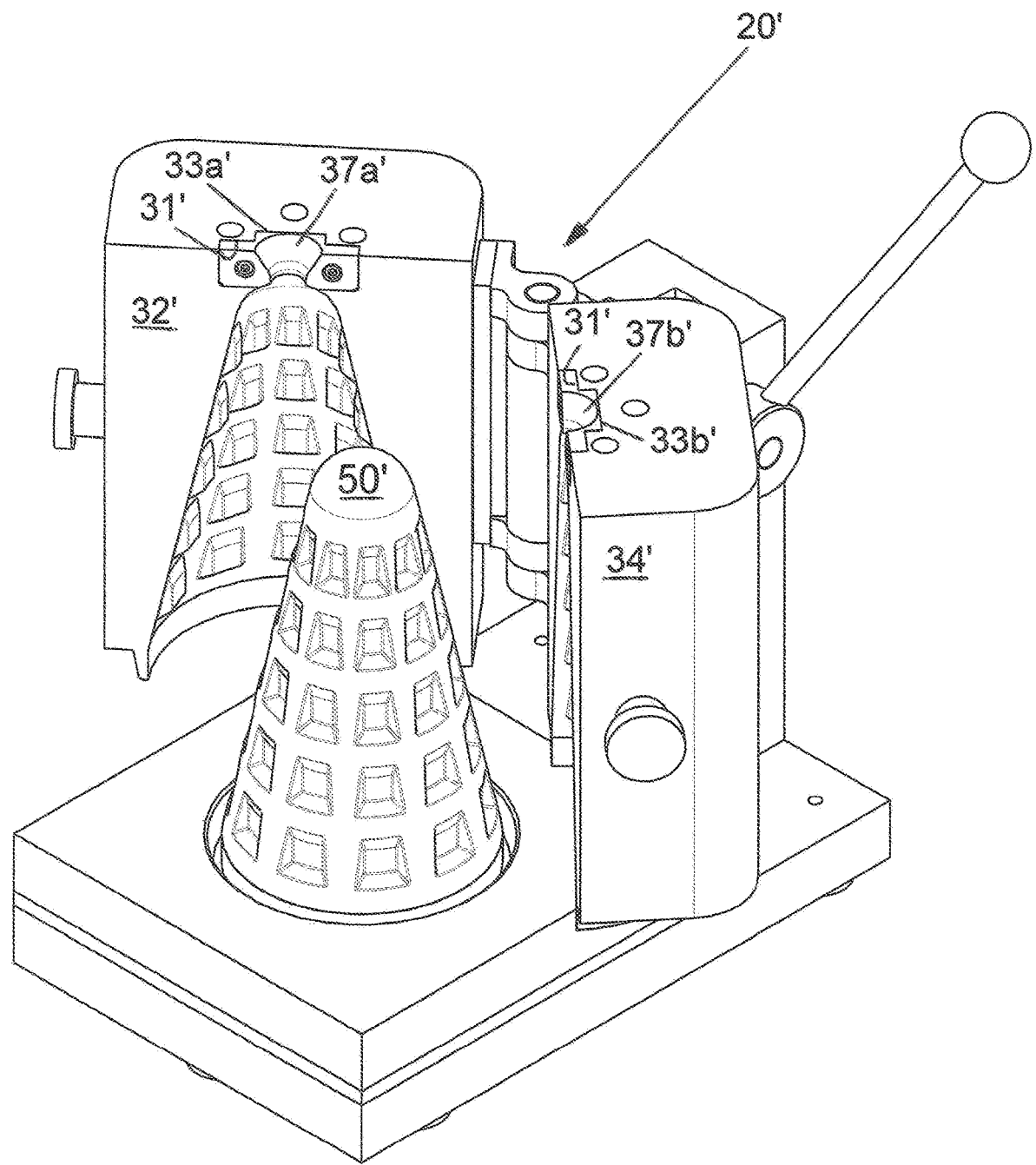
FIG. 5 is a view of a second embodiment of the waffle cone forming apparatus of the present invention.

A second embodiment of the waffle cone molding apparatus of the present invention is shown generally at 20' in FIG. 5. Cavities 31' are formed into each of halves 32' and 34' into which batter fill cavity inserts or gates 33a' and 33b' are secured. This tweaking of the configuration allows for liquid waffle batter to be poured into the cone formed by tapered surfaces 37a' and 37b' in clam-shell cavity mold members 32' and 34' which then flows downwardly over the domed conical mold 50'. The liquid waffle batter will generally take a bit longer to bake than the pre-made dough in order to drive off the extra liquid present in the batter vs the dough.

Various changes, alternatives, and modifications will become apparent to a person of ordinary skill in the art after a reading of the foregoing specification. It is intended that all such changes, alternatives, and modifications as fall within the scope of the appended claims be considered part of the present invention.

I claim:

1. A waffle cone forming apparatus comprising:
   an inner conical mold with a first plurality of waffle-forming recesses of a first particular size, a first particular shape and a first particular number are arrayed in several horizontally extending rows about the periphery of said inner conical mold;
   a clamshell mold assembly which surrounds said inner conical mold, said clam-shell mold assembly having two halves hinged together, each of said halves having an inner periphery with a second plurality of protrusions formed thereon, said second plurality of protrusions collectively on both halves, corresponding in size, shape and number to said first plurality of waffle-forming recesses about said periphery of said inner conical mold;
   heating elements associated with each of said inner conical mold and said clamshell mold assembly which surrounds said inner conical mold to bake a waffle dough or batter placed in said waffle cone forming apparatus;
   a rotatable handle secured to a pinion gear operably engageable with a gear rack secured to a rear surface of said clamshell mold assembly for manually raising and lowering said clamshell mold assembly.

2. A waffle cone forming apparatus as set forth in claim 1 further comprising a pair of knobs on said clamshell mold assembly one said knob of said pair of knobs on each of said two halves of said clamshell mold assembly to facilitate opening and closing of said clamshell mold assembly.

3. The waffle cone forming assembly of claim 1 comprising structure for compressing said two halves of said clamshell mold assembly about said inner conical mold, said structure for compressing including a tapered semi-annular surface formed on a bottom edge of each of said two halves of said clamshell mold assembly and a cooperating annular ring surrounding said inner conical mold which engages said tapered semi-annular surface on said bottom edge of each of said two halves of said clamshell mold assembly when said clamshell mold assembly is lowered into contact with said cooperating annular ring.

4. The waffle cone forming apparatus of claim 2 further comprising a pair of gates, one said gate sitting atop each of said clamshell mold halves to facilitate pouring of liquid waffle batter into said waffle cone forming apparatus.

* * * * *